US007260577B1

United States Patent
Alavi et al.

(10) Patent No.: US 7,260,577 B1
(45) Date of Patent: Aug. 21, 2007

(54) METHOD AND SYSTEM FOR PROVIDING BUSINESS INTELLIGENCE WEB CONTENT WITH REDUCED CLIENT-SIDE PROCESSING

(75) Inventors: Ali Alavi, Arlington, VA (US); Glenn J. Boysko, Herndon, VA (US); Gunther L. Brenes, Oakland, CA (US); L. Douglas Everhart, Arlington, VA (US); Benjamin Z. Li, Great Falls, VA (US); Arturo Oliver, Reston, VA (US); Abhimanyu Warikoo, New York, NY (US)

(73) Assignee: Microstrategy, Inc., McLean, VA (US)

( * ) Notice: Subject to any disclaimer, the term of this patent is extended or adjusted under 35 U.S.C. 154(b) by 531 days.

(21) Appl. No.: 10/641,041

(22) Filed: Aug. 15, 2003

Related U.S. Application Data

(63) Continuation of application No. 09/884,444, filed on Jun. 20, 2001, now Pat. No. 6,658,432.

(51) Int. Cl.
*G06F 17/30* (2006.01)
(52) U.S. Cl. .................. 707/100; 707/104.1
(58) Field of Classification Search .......... 707/1–10, 707/100–104.1, 200–206; 717/108; 709/246
See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 5,197,005 A | 3/1993 | Shwartz | |
| 5,276,870 A | 1/1994 | Shan | |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nierenberg | |
| 5,737,592 A | 4/1998 | Nguyen | |
| 5,864,856 A | 1/1999 | Young | |
| 5,914,878 A | 6/1999 | Yamamoto | |
| 5,974,441 A | 10/1999 | Rogers | |
| 6,154,766 A | 11/2000 | Yost | |
| 6,247,008 B1 | 6/2001 | Cambot | |
| 6,279,033 B1 | 8/2001 | Selvarajan | |
| 6,408,292 B1 | 6/2002 | Bakalash et al. | |
| 6,424,979 B1 | 7/2002 | Livingston et al. | |

(Continued)

OTHER PUBLICATIONS

J. Emigh, Information Builders, Inc. Launches WebFocus Suite, pp. 1-3.

(Continued)

*Primary Examiner*—Yicun Wu
(74) *Attorney, Agent, or Firm*—Hunton & Williams, LLP

(57) ABSTRACT

A layered architecture for communication of reporting system reports to users connecting via a web server. Users communicate via HTTP with web servers without download of plugins or executable files to the user system. The web servers are clustered to balance requests and transmit the requests. The web servers pass report requests via XML to the business intelligence servers to perform the work with the databases. The business intelligence servers convert reports into XML and provide the XML-based version to the web server. The web server then transmits an HTML or DHTML report back to the client over the web.

17 Claims, 3 Drawing Sheets

U.S. PATENT DOCUMENTS

| | | | |
|---|---|---|---|
| 6,668,253 B1 * | 12/2003 | Thompson et al. | 707/10 |
| 6,810,429 B1 * | 10/2004 | Walsh et al. | 709/246 |
| 7,020,869 B2 * | 3/2006 | Abrari et al. | 717/108 |
| 7,072,934 B2 * | 7/2006 | Helgeson et al. | 709/203 |

OTHER PUBLICATIONS

Robert C. Stern, Bruce M. Anderson and Craig W. Thompson, A Menu-Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Maipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Microstrategy Announces DSS Web, First Relational OLAP Interface for Accessing Data Warehouses Via the World Wide Web.

Microstrategy Announces DSS Web 4.1, Latest Version Provides Web-Based Warehouse Users With More Complex Ad Hoc Analysis Capabilities Than Any Product Available.

Microstrategy Announces DSS Web 5.0, DSS Web Introduces the Web-Cast of Decision Support.

Microstrategy Addresses Customer Needs With DSS Web 5.1, New Version Provides a Bridge Between Active and Passive Decision Support Environments and Eases the Global Implementation and Deployment Process.

Microstrategy Introduces DSS Web Standard Edition, Web Interface Provides Powerful, Easy-to-Use DSS Tool For Mainstream End-User Market.

Microstrategy Announces Enhanced Versions of DSS Web and DSS Server, New 5.5 Versions offer Advanced Reporting Functionality on Top of the Industry's Most Powerful Analytical Engine for Enterprise-Wide DSS Solutions.

Business Objects User's Guide Version 5.1.
Getting Started with Business Objects Version 5.1.
Business Objects Deployment Guide.
Broadcast Agent 5.1.
Business Objects 5.1.
Web Intelligence 2.6.
Business Objects Designer's Guide Version 5.1.
Business Objects Error Message Guide Version 5.1.
Business Objects Generic ODBC Access Guide Version 5.1.
Business Objects Info View User's Guide.
Business Objects Installation and Upgrade Guide.
Business Objects MS Access Database Guide Version 5.1.
Business Objects MS SQL Server Database Guide Version 5.1.
Business Objections Supervisor's Guide Version 5.1.
Quick Start MicroStrategy Agent Version 6.0.
User Guide MicroStrategy Agent Version 6.0.
User Guide MicroStrategy Architect Version 6.0.
User Guide MicroStrategy Objects Version 6.0.
Excel Add-In MicroStrategy Objects Version 6.0.
User Guide MicroStrategy Intelligence Server Version 6.0.
User Guide MicroStrategy Administrator Version 6.0.
Administrator Guide MicroStrategy Administrator Version 6.5.
Web Intelligence Key Sales Messages.
Web Intelligence Sizing and Capacity Planning Questions and Answers.
MicroStrategy Web Version 6.0 System Guide.
Developer Guide MicroStrategy Web Version 6.0.
System Guide Microstratety Web Version 6.5.
Developer Guide MicroStrategy Web Version 6.5.

* cited by examiner

METHOD AND SYSTEM FOR PROVIDING BUSINESS INTELLIGENCE WEB CONTENT WITH REDUCED CLIENT-SIDE PROCESSING

RELATED APPLICATIONS

This application is a Continuation of U.S. patent application Ser. No. 09/884,444, filed Jun. 20, 2001 now U.S. Pat. No. 6,658,432, entitled "METHOD AND SYSTEM FOR PROVIDING BUSINESS INTELLIGENCE WEB CONTENT WITH REDUCED CLIENT-SIDE PROCESSING," the contents of which are incorporated herein by reference in their entirety.

FIELD OF THE INVENTION

This invention relates generally to systems and methods for a layered web-business intelligence server architecture for use in a reporting system, decision support system, business intelligence system and on-line analytical processing (OLAP) system to enable the efficient exchange of business intelligence information.

BACKGROUND OF THE INVENTION

Decision support systems (DSS) have been developed to efficiently retrieve selected information from data warehouses, thereby providing business intelligence information to the organization. One type of decision support system is known as an on-line analytical processing system ("OLAP"). In general, OLAP systems analyze the data from a number of different perspectives and support complex analyses against large input data sets.

In conventional web-based OLAP access systems, the exchange of business intelligence information between World Wide Web client computer systems and business intelligence server computer systems requires substantial processing capabilities and resources on the individual client computer systems. Often, the interface between the client and the server systems require the client systems to download, install and run a plurality of web browser plugin utilities in order to view or effectively interact with the exchanged information. By requiring the client-side systems to perform a substantial portion of the information processing, server-side applications were able to effectively manipulate the large quantities of data typically in business intelligence or OLAP environments. However, the ever changing landscape of browser and plugin software (e.g., java) makes it difficult for client-side systems to remain current with every element of technology necessary to interact with the server-side applications providing the business intelligent information. Further, for individuals who routinely use more than one client-side machine to access information, ensuring that each machine includes all required elements is difficult and sometimes impossible Accordingly, existing business intelligence systems fail to provide a method and system for exchanging business intelligence information over a computer network wherein client-side processing and software requirements are reduced to a level compatible with virtually all client-side systems.

SUMMARY OF THE INVENTION

The present invention overcomes the problems noted above, and provides additional advantages, by providing for a system for enabling the exchange of business intelligence information over a computer network including at least one client computer system for requesting and receiving the business intelligence information. According to the present invention, users access business intelligence information over the Internet and World Wide Web to one of a plurality of web servers that balance the incoming and outgoing load. In a preferred embodiment, the user system comprises a standard browser and communicates with the web servers without downloading any plugins or other programs to execute reports. Web server/user communication preferably occurs through use of HTML/DHTML only without program downloading.

The web servers are then connected to one or more business intelligence server system that perform analysis using databases and data warehouses. According to a preferred embodiment, the web servers do not have a direct access to any of the databases or data warehouses on which business intelligence operations occur. Rather, the web servers pass report requests via XML to the business intelligence servers to perform the work with the databases. The business intelligence servers convert reports into XML and provide the XML-based version to the web server. The web server then transmits an HTML or DHTML report back to the client over the web.

By using such a layered architecture, a more efficient and secure system is provided. In particular, because the web server does not have direct access to the database, the system is less exposed to potential exposure to persons without authorization. Moreover, the layered architecture enables the provision of a "light" client system such that the client system only uses a browser. This is important for user devices with low processing power and memory (e.g., PDAs, WAP phones, etc.) and also reduced transmission time because the user device does not have to have a plugin downloaded with the report to be able to view the report. The system also provides better efficiency because the business intelligence server systems are higher powered and thus able to handle the processor-intensive report requests.

Other advantages of the present invention will be appreciated by those of ordinary skill in the art from the detailed description that follows.

DETAILED DESCRIPTION OF PREFERRED EMBODIMENTS

The present invention may provide a system for web-based communication between a user and a business intelligence system. One embodiment of such a business intelligence system is shown in FIGS. 1 and 2.

Figure 1:
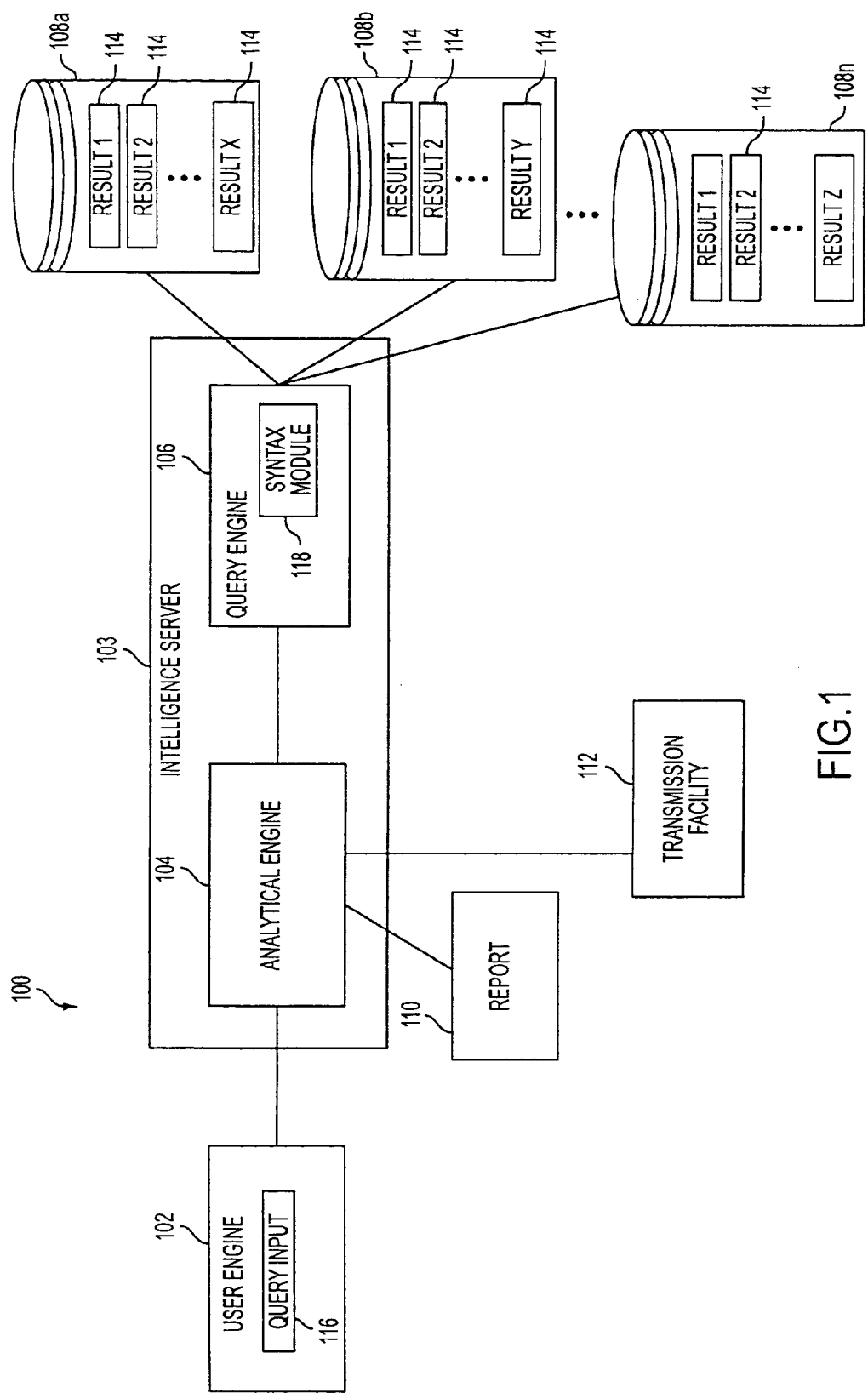
FIG. 1 is a block diagram illustrating an architecture for a system according to an embodiment of the invention.
Figure 2:
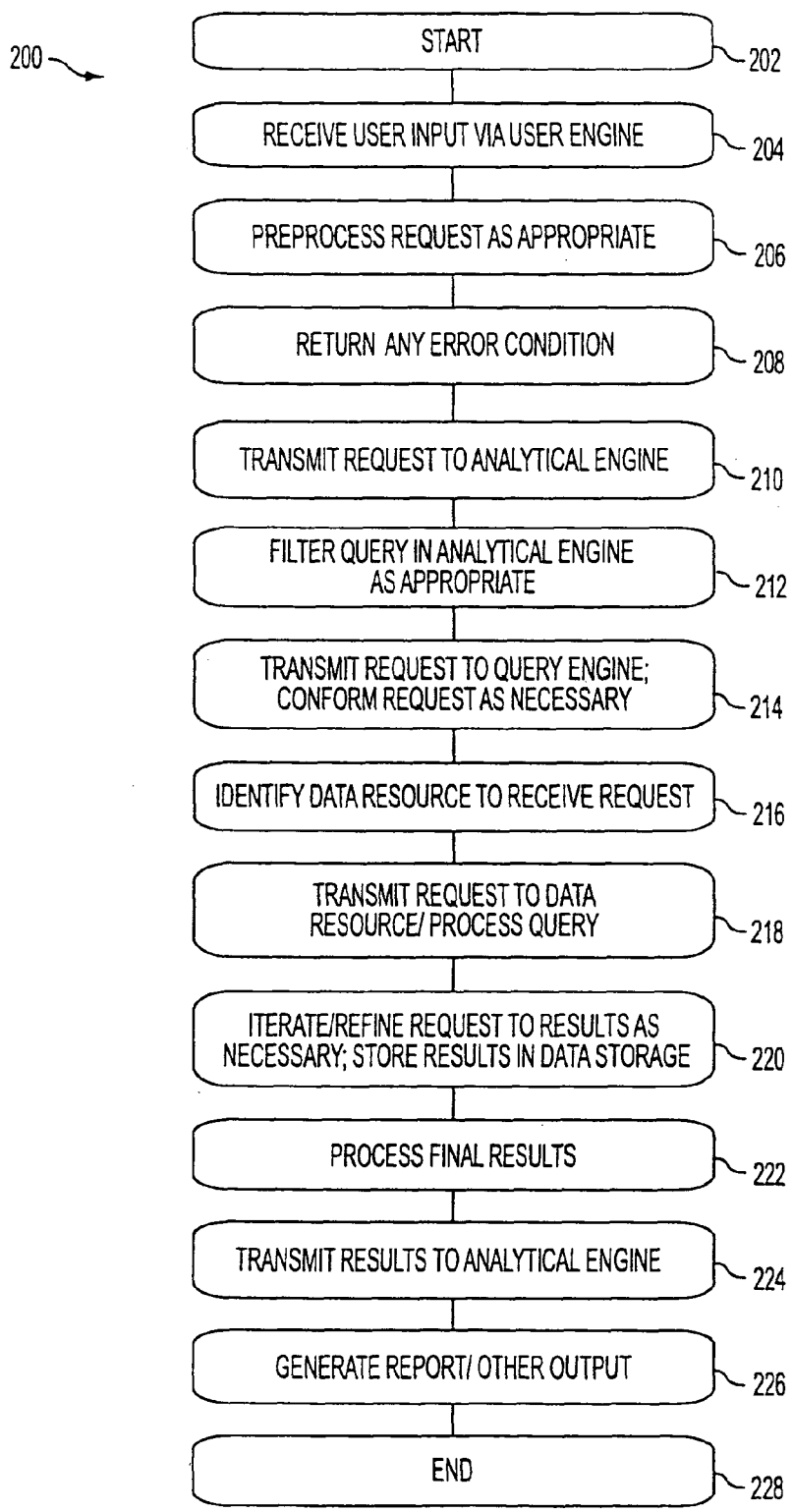
FIG. 2 is a flowchart illustrating steps performed by a process utilizing a query engine according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be provided.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of scheduled reports or services that are processed according to a schedule. Users may then subscribe the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a Macintosh operating system, an Apache platform, an OpenStep™ operating system, or another similar operating system or platform.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through all sorts of data delivery devices including telephones, pages, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
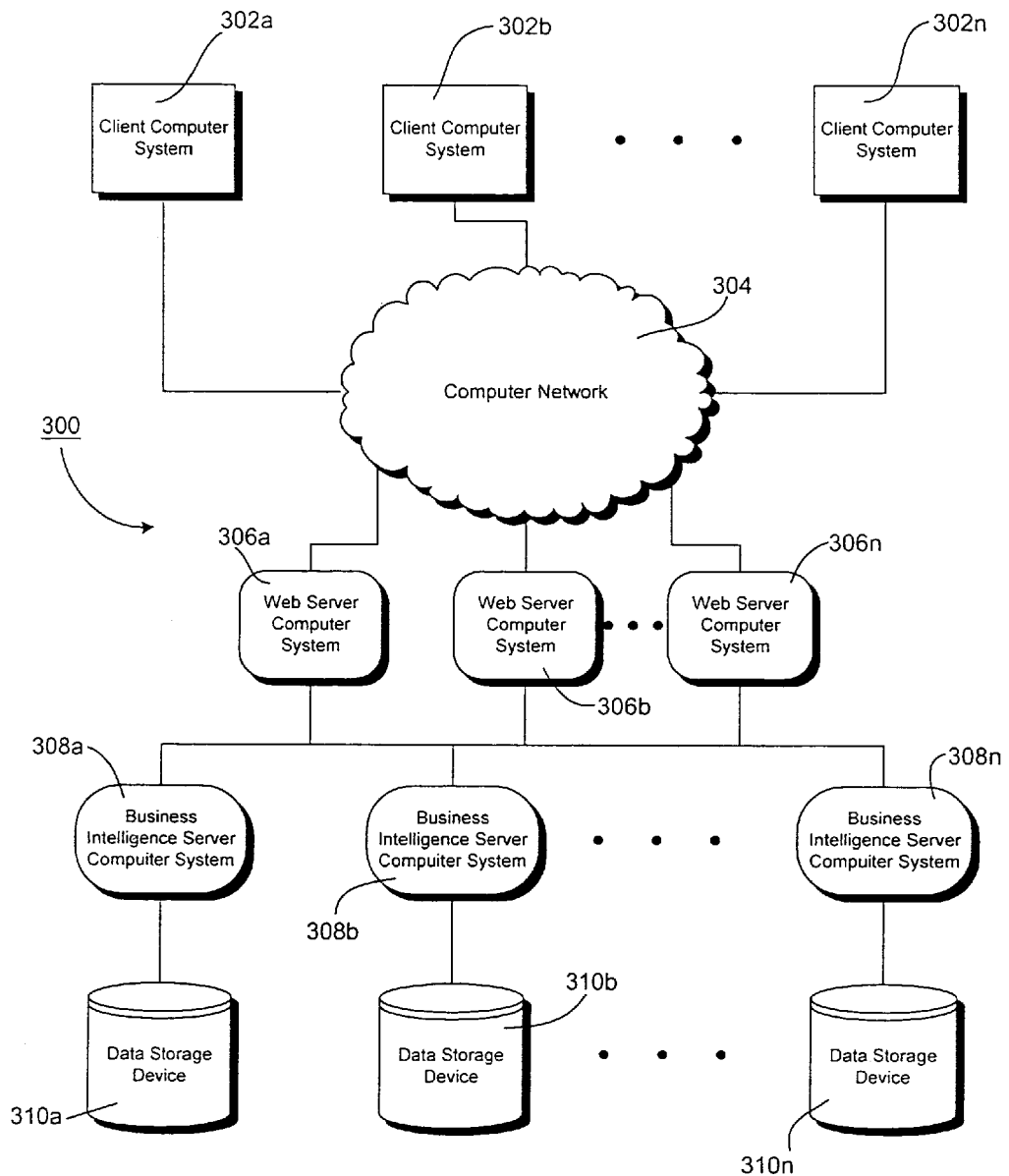
FIG. 3 is a generalized block diagram illustrating one embodiment of a system for providing business intelligence information data over a computer network.

Now referring to FIG. 3, there is shown a generalized block diagram illustrating one embodiment of a system 300 for providing reporting system reports over a computer network in accordance with the present invention. In particular, one or more client systems 302a, 302b . . . 302n (where n is an arbitrary number) that preferably execute a client browser application that supports the HTTP protocol, are connected to a computer network 304, such as the Internet. Further, one or more web server computer systems 306a, 306b . . . 306n (where n is an arbitrary number), executing one or more web server applications are also coupled to the computer network 304. In one embodiment, a plurality of web server computer systems 306a, 306b . . . 306n are operatively joined together to form a server cluster, thereby improving the performance of the web server applications being executed thereon.

In accordance with one embodiment of the present invention, one or more business intelligence server computer systems 308a, 308b . . . 308n are operatively connected to the one or more web servers computer systems 306a, 306b . . . 306n for providing the analytical and querying functions described above in relation to the system of FIG. 1. Business intelligence server computer systems may comprise an OLAP system. Also, it should be understood that business intelligence computer systems may also comprise reporting computer systems and decision support computer systems.

As with the plurality of web server computer systems 306a, 306b . . . 306n, the business intelligence server computer systems 308a, 308b . . . 308n may also be operatively joined together to form a server cluster. In a preferred embodiment, the one or more web server computer systems and the one or more business intelligence computer systems are configured to format, send and receive information utilizing extensible markup language (XML).

Upon receiving a query request from at least one of the client computer systems 302a, 302b . . . 302n via a HTTP formatted document such as hypertext markup language (HTML) or dynamic hypertext markup language (DHTML), the web server application preferably formats the request into an XML query document utilizing a specific XML application program interface (API). In one embodiment, this XML query document is then transmitted to at least one of the business intelligence sever applications residing on the business intelligence server computer systems 308. In an alternative embodiment, the web server application may operate to format the request into XML using a java API, rather than the XML API. As is well known in the art, Java is a platform-independent, object oriented, multi-threaded and extendible programming language. The java API is essentially a simplified interface designed to enable vendors desiring to create applications for calling the business intelligence information, to format their applications without requiring a detailed understanding of the complex XML API applied. The web server, in response to receiving a java API request, completes the XML conversion for transmission to the business intelligence server computer systems.

Upon receipt of a properly formatted XML query document, the business intelligence server computer system 308 may then communicate with one or more data storage devices 310*a*, 310*b* . . . 310*n* to execute a report to generate a report result using according to the process described above with reference to FIGS. 1 and 2.

According to a preferred embodiment of the present invention, all business intelligence activity is conducted on the business intelligence server system 308 and not on the web server computer systems 306*a*, 306*b* . . . 306*n* or the client computer systems 302*a*, 302*b* . . . 302*n*. Indeed, according to this preferred embodiment, the webs sever systems 306 do not have direct access to any of the data in the database system used to generate the business intelligence reports. This enables efficient clustering of the web servers and results in optimized data transfer between the web server computer systems 306 and the client computer systems 302. Additionally, by limiting access to the database to the business intelligence servers, data security is substantially increased.

Once the business intelligence server system 308 has performed its logic and retrieved the requested information through use of the at least one data storage device 310*a*, 310*b* . . . 310*n*, the entire process is reversed. In particular, the retrieved information is formatted into an XML results document, transmitted to the web server computer system 306, reformatting into a simple browser-executable format such as HMTL or DHTML and returned to the client computer system 302 via the computer network 304. By performing the processing on the clustered business intelligence server system 308, information exchange between the web server computer systems 306 and the client computer systems 304 is substantially increased.

This layered architecture is an advance over prior web-based reporting systems because it reduces the amount of processing occurring at the client end. This invention also streamlines the web-server processing for maximum performance. Also, the web servers do not have to be configured to know how to access any of the data in the databases to perform operations. This is particularly advantageous because often, a business intelligence system may have to access data from multiple different types of relational database systems. Therefore, only the business intelligence server system is provided with the information that enables it to retrieve and perform operations on data in the multiple databases.

Further, conventional systems also require a user state to be maintained at the web server. By providing the above-described layered architecture, the present invention eliminates this requirement, thereby enabling server clustering for maximum scalability, and further requiring reduced memory expenditure per system user. By requiring the web servers to perform only the tasks associated with user navigation and html/xml conversion, the web servers are more efficiently scalable for maximum productivity.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A system for enabling the exchange of reporting system information over a computer network comprising:
   at least one web server operatively connected to one or more client systems over a HTTP-communication protocol network, wherein the at least one web server and one or more client systems communicate reporting system requests and information without downloading any executable files from the web server to the client system;
   at least one reporting server operatively connected to the at least one web server, wherein the web server and the reporting server communicate using an extensible markup language;
   at least one data storage device operatively connected to the at least one reporting server; and
   the at least one reporting server executing the reporting request from the at least one client system using the at least one data storage device and transmitting the retrieved information to the at least one web server using the extensible markup language;
   wherein the retrieved information is converted, at the at least one web server, to HTML or DHTML and transmitted to the at least one client system without downloading any executable files and wherein the at least one web server does not have a direct connection to the at least one data storage device.

2. The system of claim 1, wherein the web server does not perform any reporting system operations.

3. The system of claim 1, further comprising a plurality of web servers operating as a web server cluster.

4. The system of claim 1, further comprising a plurality of reporting systems operating as a reporting system cluster.

5. The system of claim 1, wherein the reporting system comprises an OLAP system.

6. A method for enabling the exchange of reporting system information over a computer network comprising the steps of:
   receiving at one or more web servers using HTTP a user request for reporting system information from a user system;
   converting the request to an extensible markup language request, at the one or more web servers, and transmitting that to a reporting server;
   the reporting server executing the reporting request from the client system and transmitting the retrieved information to the at least one web server using the extensible markup language; and converting the extensible markup language report to HTML or DHTML and transmitting it to the user system without downloading any executable files.

7. The method of claim 6, wherein the step of converting the request to an extensible markup language request further comprises the steps of:
converting the request into a platform-independent, object oriented, multi-threaded and extendible programming language request using a platform-independent, object oriented, multi-threaded and extendible programming language application program interface; and
converting the platform-independent, object oriented multi-threaded and extendible programming language requests into the extensible markup language request.

8. The method of claim 6, wherein the web server does not perform any reporting system operations.

9. The method of claim 6, further comprising the step of providing a clustered set of web servers to receive user requests.

10. The method of claim 6, further comprising the step of providing a clustered set of reporting systems to process reporting system report requests.

11. The method of claim 6, wherein the reporting system comprises and OLAP system.

12. A medium for causing a processor to enable the exchange of reporting system information over a computer network, the medium comprising code for causing a processor to perform the steps of:
receiving at one or more web servers using HTTP a user request for reporting system information from a user system;
converting the request to an extensible markup language request, at the one or more web servers, and transmitting that to a reporting server, the reporting server executing the reporting request from the client system using and transmitting the retrieved information to the at least one web server using the extensible markup language; and
converting the extensible markup language report to HTML or DHTML and transmitting it to the user system without downloading any executable files.

13. The medium of claim 12, wherein the web server does not perform any reporting system operations.

14. The medium of claim 12, wherein the medium further comprises code for causing a processor to operated a clustered set of web servers to receive user requests.

15. The medium of claim 12, wherein the code for causing a processor to perform the step of converting the request to an extensible markup language request further comprises code for causing the processor to perform the steps of:
converting the request into a platform-independent, object oriented, multi-threaded and extendible programming language request using a platform-independent, object oriented, multi-threaded and extendible programming language application program interface; and
converting the platform-independent, object oriented, multi-threaded and extendible programming language request into the extensible markup language request.

16. The medium of claim 12, wherein the medium further comprises code for causing a processor to operate a clustered set of reporting systems to process reporting system report requests.

17. The medium of claim 12, wherein the reporting system comprises an OLAP system.

\* \* \* \* \*